United States Patent
Ohno et al.

(10) Patent No.: US 9,744,935 B2
(45) Date of Patent: Aug. 29, 2017

(54) VEHICLE CURTAIN AIRBAG DEVICE

(71) Applicant: Toyota Jidosha Kabushiki Kaisha, Toyota-shi, Aichi-ken (JP)

(72) Inventors: Mitsuyoshi Ohno, Moyoshi (JP); Osamu Fukawatase, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/745,906

(22) Filed: Jun. 22, 2015

(65) Prior Publication Data
US 2016/0031402 A1    Feb. 4, 2016

(30) Foreign Application Priority Data

Aug. 1, 2014   (JP) .................................. 2014-157927

(51) Int. Cl.
*B60R 21/232*    (2011.01)
*B60R 21/237*    (2006.01)
*B60R 21/231*    (2011.01)

(52) U.S. Cl.
CPC .......... *B60R 21/232* (2013.01); *B60R 21/237* (2013.01); *B60R 2021/23192* (2013.01)

(58) Field of Classification Search
CPC .................................................. B60R 21/232
See application file for complete search history.

(56) References Cited

U.S. PATENT DOCUMENTS

| | | | |
|---|---|---|---|
| 2006/0012156 A1* | 1/2006 | Boxey | B60R 21/232 280/730.2 |
| 2007/0138778 A1 | 6/2007 | Takemura et al. | |
| 2009/0256336 A1 | 10/2009 | Takemura et al. | |
| 2011/0187086 A1* | 8/2011 | Fulmer | B60R 21/20 280/730.2 |
| 2012/0032426 A1* | 2/2012 | Tanaka | B60R 21/232 280/730.2 |
| 2012/0098240 A1* | 4/2012 | Kato | B60R 21/232 280/730.2 |
| 2012/0126517 A1* | 5/2012 | Kato | B60R 21/232 280/730.2 |

(Continued)

FOREIGN PATENT DOCUMENTS

| | | |
|---|---|---|
| JP | 2001-328503 A | 11/2001 |
| JP | 2007-161163 A | 6/2007 |

(Continued)

*Primary Examiner* — Ruth Ilan
(74) *Attorney, Agent, or Firm* — Dinsmore & Shohl LLP

(57) ABSTRACT

There is provides a vehicle curtain airbag device including a curtain airbag, having: a front main chamber and a rear main chamber that protect occupants from a side collision, a front oblique collision chamber that is disposed at a vehicle front side, and that protects the occupant from an oblique collision, and a rollover chamber that is disposed between the front main chamber and the rear main chamber, and that protects the occupant from a rollover, wherein the curtain airbag is configured such that, during inflation and deployment of the front main chamber, the rear main chamber, the front oblique collision chamber, and the rollover chamber on receipt of gas supplied from an inflator, an internal pressure of each chamber rises in the sequence: (i) the front main chamber and the rear main chamber, (ii) the front oblique collision chamber, and (iii) the rollover chamber.

14 Claims, 7 Drawing Sheets

(56) References Cited

U.S. PATENT DOCUMENTS

| | | | | |
|---|---|---|---|---|
| 2012/0200069 A1* | 8/2012 | Kato | ............ | B60R 21/0136 |
| | | | | 280/730.2 |
| 2012/0248751 A1* | 10/2012 | Kato | ............ | B60R 21/232 |
| | | | | 280/730.2 |
| 2012/0256402 A1* | 10/2012 | Kato | ............ | B60R 21/213 |
| | | | | 280/730.2 |
| 2012/0299275 A1* | 11/2012 | Saimura | ............ | B60R 21/2346 |
| | | | | 280/729 |
| 2012/0313354 A1* | 12/2012 | Ochiai | ............ | B60R 21/232 |
| | | | | 280/728.2 |
| 2012/0313356 A1* | 12/2012 | Saimura | ............ | B60R 21/233 |
| | | | | 280/730.2 |
| 2013/0154245 A1* | 6/2013 | Fukawatase | ............ | B60R 21/2342 |
| | | | | 280/730.2 |
| 2014/0042732 A1* | 2/2014 | Taguchi | ............ | B60R 21/233 |
| | | | | 280/729 |
| 2014/0239620 A1* | 8/2014 | Kawamura | ............ | B60R 21/213 |
| | | | | 280/730.2 |
| 2014/0239621 A1* | 8/2014 | Kawamura | ............ | B60R 21/213 |
| | | | | 280/730.2 |
| 2014/0265275 A1* | 9/2014 | Rickenbach | ............ | B60R 21/232 |
| | | | | 280/739 |
| 2014/0353949 A1* | 12/2014 | Sugimori | ............ | B60R 21/2338 |
| | | | | 280/728.2 |
| 2014/0375037 A1* | 12/2014 | Arellano | ............ | B60R 21/233 |
| | | | | 280/736 |
| 2015/0084316 A1* | 3/2015 | Okuhara | ............ | B60R 21/2338 |
| | | | | 280/729 |
| 2015/0097360 A1* | 4/2015 | Ochiai | ............ | B60R 21/232 |
| | | | | 280/730.2 |
| 2015/0115582 A1* | 4/2015 | Ikenohata | ............ | B60R 21/237 |
| | | | | 280/730.2 |
| 2015/0151708 A1* | 6/2015 | Kawamura | ............ | B60R 21/232 |
| | | | | 280/728.2 |
| 2015/0336531 A1* | 11/2015 | Kawamura | ............ | B60R 21/237 |
| | | | | 280/730.2 |
| 2016/0001732 A1* | 1/2016 | Asada | ............ | B60R 21/232 |
| | | | | 280/729 |
| 2016/0031404 A1* | 2/2016 | Takedomi | ............ | B60R 21/2334 |
| | | | | 280/729 |
| 2016/0221527 A1* | 8/2016 | Sugimori | ............ | B60R 21/232 |

FOREIGN PATENT DOCUMENTS

| | | |
|---|---|---|
| JP | 2007-161167 A | 6/2007 |
| JP | 2008-006895 A | 1/2008 |
| JP | 2012-091650 A | 5/2012 |
| JP | 2012-201312 A | 10/2012 |
| JP | 2014-054939 A | 3/2014 |
| WO | 2012-008241 A1 | 1/2012 |

* cited by examiner

VEHICLE CURTAIN AIRBAG DEVICE

CROSS-REFERENCE TO RELATED APPLICATION

This application claims priority under 35 USC 119 from Japanese Patent application No. 2014-157927 filed on Aug. 1, 2014, the disclosure of which is incorporated by reference herein.

BACKGROUND

Technical Field

The present disclosure relates to a vehicle curtain airbag device.

Related Art

A curtain airbag device described in Japanese Patent Application Laid-Open (JP-A) No. 2012-201312 includes a front main chamber and a rear main chamber that inflate and deploy in a side collision so as to have front and rear seat occupant head protection areas. Delay chambers (part of a front side auxiliary chamber and rear side auxiliary chamber), serving as delayed deployment portions of which lower end portions reach below a door belt line, inflate and deploy to the vehicle front of the front main chamber and the rear main chamber, respectively. Passenger protection performance in a rollover, namely performance to suppress ejection from the vehicle, is accordingly improved.

In the curtain airbag device described above, it is conceivable that in an oblique collision, for example, the head of a passenger moving obliquely toward the front under inertia, toward a front pillar, could be protected by the front side auxiliary chamber. However, in such cases, an increase in the capacity of the airbag, and an accompanying increase in the output of an inflator, is necessitated by the respective requirements to obtain appropriate passenger protection performance in the respective collision modes of a side collision, an oblique collision, and a rollover. Since the curtain airbag might sustain damage due to high pressure gas ejected from the inflator, countermeasures such as manufacturing the curtain airbag from tough base cloth are required, leading to a large increase in cost.

SUMMARY

In consideration of the above circumstances, the present disclosure obtains a vehicle curtain airbag device contributing to obtaining appropriate passenger protection performance in respective collision modes, whilst avoiding increasing inflator output.

The first aspect of the present disclosure is a vehicle curtain airbag device having a curtain airbag, including a front main chamber and a rear main chamber that protect a front seat occupant and a rear seat occupant from a side collision, a front oblique collision chamber that is disposed at a vehicle front side of the front main chamber, and that protects the front seat occupant from an oblique collision, and a rollover chamber that is disposed between the front main chamber and the rear main chamber, and that protects the rear seat occupant from a rollover, wherein the curtain airbag is configured such that, during inflation and deployment of the front main chamber, the rear main chamber, the front oblique collision chamber, and the rollover chamber on receipt of gas supplied from an inflator, an internal pressure of each chamber rises in the following sequence: (i) the front main chamber and the rear main chamber, then (ii) the front oblique collision chamber, and then (iii) the rollover chamber.

In the first aspect, the curtain airbag includes the front and rear main chambers that protect the front seat occupant and the rear seat occupant from a side collision, the front oblique collision chamber that protects the front seat occupant from an oblique collision, and the rollover chamber that protects the rear seat occupant from a rollover. These chambers inflate and deploy on receipt of gas supplied from the inflator. When this occurs, the internal pressure of each chamber rises in the sequence of: the front and rear main chambers, the front oblique collision chamber, the rollover chamber. This accordingly contributes to obtaining appropriate passenger protection performance in each collision mode of a side collision, an oblique collision, and a rollover. Moreover, staggering the timings at which the internal pressure of each chamber increases enables efficient utilization of the gas from the inflator, thereby enabling the need to increase inflator output to be avoided.

The second aspect of the present disclosure is the vehicle curtain airbag device of the first aspect, wherein the curtain airbag further includes a rear oblique collision chamber that is disposed between the front main chamber and the rollover chamber, and that protects the rear seat occupant from an oblique collision; and the curtain airbag is configured such that, during inflation and deployment of the front main chamber, the rear main chamber, the front oblique collision chamber, the rear oblique collision chamber, and the rollover chamber on receipt of gas supplied from the inflator, an internal pressure of each chamber rises in the following sequence: (i) the front main chamber and the rear main chamber, then (ii) the front oblique collision chamber and the rear oblique collision chamber, and then (iii) the rollover chamber.

In the second aspect, the internal pressure of the rear oblique collision chamber rises at the same place in the sequence as the internal pressure of the front oblique collision chamber, namely after the front and rear main chambers and before the rollover chamber. This thereby enables the internal pressure of the rear oblique collision chamber that protects the rear seat occupant from an oblique collision to be made to rise at an appropriate timing for an oblique collision.

The third aspect of the present disclosure is vehicle curtain airbag device of the first aspect, wherein the curtain airbag includes a gas supply path that supplies gas from the inflator to the front main chamber and the rear main chamber, a front oblique collision supply opening that supplies gas to the front oblique collision chamber via the front main chamber; and a rollover supply opening that supplies gas to the rollover chamber via the front main chamber, and that is set with a smaller cross-sectional area than the front oblique collision supply opening.

In the third aspect, gas from the inflator is supplied to the front and rear main chambers through the gas supply path. This thereby enables the internal pressure of the front and rear main chambers to be made to rise at the same timing. Moreover, a portion of the gas supplied to the front main chamber is supplied to the front oblique collision chamber and the rollover chamber via the front oblique collision supply opening and the rollover supply opening. This thereby enables a rise in the internal pressure of the front oblique collision chamber and the rollover chamber to be delayed with respect to the rise in the internal pressure of the front and rear main chambers. Moreover, a rise in the internal pressure of the rollover chamber can be delayed with respect to the rise in the internal pressure of the front oblique collision chamber due to setting the cross-sectional area of the rollover supply opening smaller than the cross-sectional area of the front oblique collision supply opening. Due to the above, the internal pressure of the respective chambers can be made to rise in the sequence: front and rear main chambers, front oblique collision chambers, rollover chamber.

The fourth aspect of the present disclosure is vehicle curtain airbag device of the second aspect, wherein the curtain airbag includes a gas supply path that supplies gas from the inflator to the front main chamber and the rear main chamber, a front oblique collision supply opening that supplies gas to the front oblique collision chamber via the front main chamber, a rear oblique collision supply opening that supplies gas to the rear oblique collision chamber via the front main chamber, and a rollover supply opening that supplies gas to the rollover chamber via the rear oblique collision chamber, and that is set with a smaller cross-sectional area than the front oblique collision supply opening and the rear oblique collision supply opening.

In the fourth aspect, gas from the inflator is supplied to the front and rear main chambers through the gas supply path. This thereby enables the internal pressure of the front and rear main chambers to be made to rise at the same timing. Moreover, a portion of the gas supplied to the front main chamber is supplied to the front and rear oblique collision chambers and the rollover chamber, via the front and rear oblique collision supply openings and the rollover supply opening. This thereby enables a rise in the internal pressure of the front and rear oblique collision chambers and the rollover chamber to be delayed with respect to the rise in the internal pressure of the front and rear main chambers. Moreover, a rise in the internal pressure of the rollover chamber can be delayed with respect to the rise in the internal pressure of the front and rear oblique collision chambers due to setting the cross-sectional area of the rollover supply opening smaller than the cross-sectional areas of the front and rear oblique collision supply openings. Due to the above, the internal pressure of the respective chambers can be made to rise in the sequence: front and rear main chambers, front and rear oblique collision chambers, rollover chamber.

The fifth aspect of the present disclosure is vehicle curtain airbag device of the third and the forth aspects, wherein the gas supply path is disposed at an upper end side of the curtain airbag, the oblique collision supply opening and the rollover supply opening are disposed at a lower end side of the curtain airbag, and the curtain airbag is housed in an upper end side of a side section of a vehicle cabin, in a state rolled up from the lower end side to the upper end side of the curtain airbag.

In the fifth aspect, gas from the inflator is supplied to the front and rear main chambers through the gas supply path provided at the upper end side of the curtain airbag. Accordingly, when the front and rear main chambers being to inflate and deploy, the curtain airbag deploys toward the lower side while unrolling from the upper end side. When the lower end side of the curtain airbag has unrolled, a portion of the gas supplied to the front main chamber is supplied to the oblique collision chamber and the rollover chamber via the oblique collision supply opening and the rollover supply opening provided at the lower end side of the curtain airbag. Namely, the supply of gas to the oblique collision chamber and the rollover chamber can be prevented until the lower end side of the curtain airbag has unrolled. This thereby enables the timings at which internal pressure of the oblique collision chamber and the rollover chamber rise to be adjusted using a simple configuration.

The sixth aspect of the present disclosure is the vehicle curtain airbag device of the third and the forth aspects, wherein the gas supply path is disposed at an upper end side of the curtain airbag, the front oblique collision supply opening and the rollover supply opening are disposed at a lower end side of the curtain airbag, and the curtain airbag is housed in an upper end side of a side section of a vehicle cabin, in a state in which the lower end side of the curtain airbag is folded up and the lower end side is stitched with a tear seam at a side of the front main chamber, and further folded up toward the upper end side of the curtain airbag.

In the sixth aspect, gas from the inflator is supplied to the front and rear main chambers through the gas supply path provided at the upper end side of the curtain airbag. Accordingly, when the front and rear main chambers being to inflate and deploy, the curtain airbag deploys toward the lower side while the folded state unfolds from the upper end side. Then, the tear seam stitched at the side of the front main chamber at the lower end side of the curtain airbag splits under inflation pressure of the front main chamber, and the folded up state of the lower end side of the curtain airbag unfolds. Accordingly, a portion of the gas supplied to the front main chamber is supplied to the oblique collision chamber and the rollover chamber via the oblique collision supply opening and the rollover supply opening provided at the lower end side of the curtain airbag. Namely, the supply of gas to the oblique collision chamber and the rollover chamber can be prevented until the tear seam has split and the folded state of the lower end side of the curtain airbag has unfolded. This thereby enables the timings at which internal pressure of the oblique collision chamber and the rollover chamber rise to be adjusted using a simple configuration.

The seventh aspect of the present disclosure is the vehicle curtain airbag device of the sixth aspect, wherein the lower end side of the curtain airbag unfolds from a folded state when the tear seam splits due to inflation pressure of the gas supplied from the inflator the front main chamber.

As described above, the vehicle curtain airbag device according to the present disclosure contributes to obtaining appropriate passenger protection performance in respective collision modes, whilst avoiding increasing inflator output.

BRIEF DESCRIPTION OF THE DRAWINGS

Exemplary embodiments of the present disclosure will be described in detail based in the following figures, wherein.

DETAILED DESCRIPTION

First Exemplary Embodiment

Explanation follows regarding a vehicle curtain airbag device 10 according to a first exemplary embodiment of the present disclosure, with reference to FIG. 1 to FIG. 9. Note that in each of the drawings, the arrow FR, the arrow UP, and the arrow OUT respectively indicate the vehicle front direction (direction of travel), the vehicle upward direction, and the vehicle width direction outside, as appropriate. Hereafter, unless specifically indicated, reference simply to the front-rear and up-down directions refers to the front and rear in the vehicle front-rear direction, and up and down in the vehicle up-down direction.

The vehicle curtain airbag device 10 according to the first exemplary embodiment of the present disclosure is a device for protecting a passenger (in particular, their head) in side collisions, oblique collisions, and rollovers. An outline of the first exemplary embodiment will first be explained with reference to FIG. 1 to FIG. 3, before explaining specific configurations of the vehicle curtain airbag device 10.

Outline of the First Exemplary Embodiment

Figure 1:
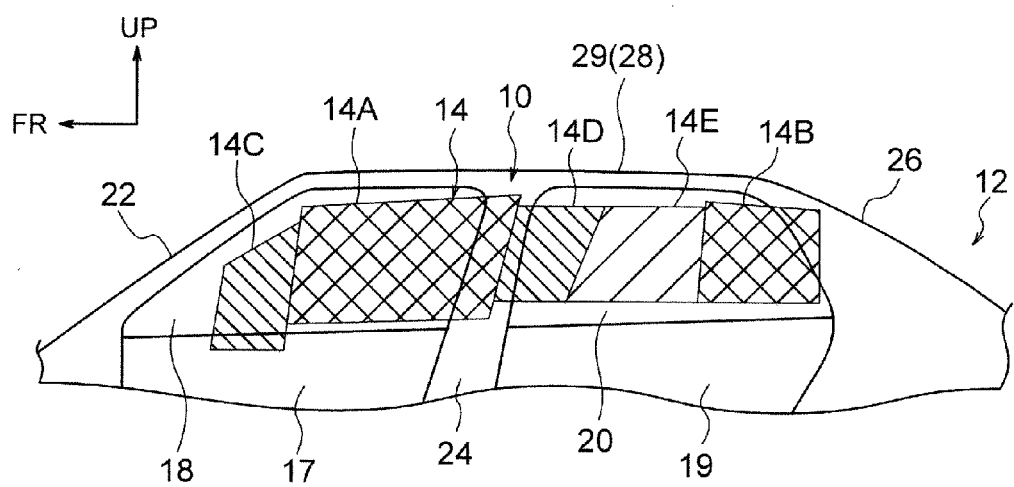
FIG. 1 is a side view of a schematic configuration of a vehicle curtain airbag device according to a first exemplary embodiment of the present disclosure as viewed from inside the vehicle, illustrating an inflated and deployed state of a curtain airbag.
Figure 4:
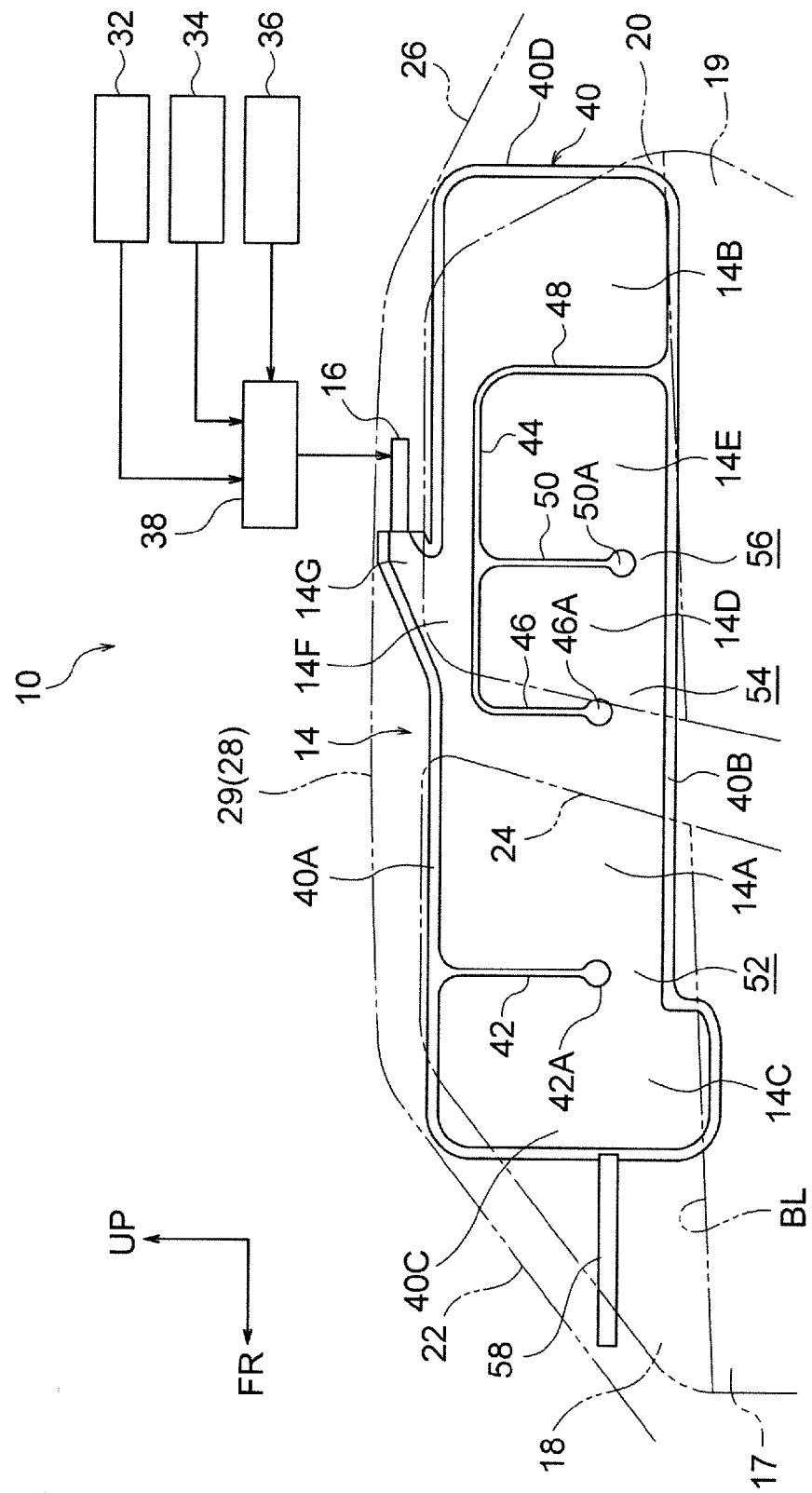
FIG. 4 is a side view of an overall configuration of a vehicle curtain airbag device according to the first exemplary embodiment, as viewed from inside a vehicle, illustrating an inflated and deployed state of a curtain airbag.

As schematically illustrated in FIG. 1, the vehicle curtain airbag device 10 according to the first exemplary embodiment is installed to a sedan type car 12, and includes curtain airbags 14 and inflators 16 (see FIG. 4—not illustrated in FIG. 1). Each curtain airbag 14 is formed so as to receive gas supplied from the inflators 16 and to inflate and deploy in a curtain shape running along front and rear side window glass 18, 20, and a B pillar (center pillar) 24, provided to a side section of the vehicle cabin. The front side window glass 18 is provided to a front side door 17 positioned at the side of a front seat, not illustrated in the drawings, and the rear side window glass 20 is provided to a rear side door 19 positioned at the side of a rear seat, not illustrated in the drawings. The side window glass 18, 20 are covered by the curtain airbag 14.

Figure 2:
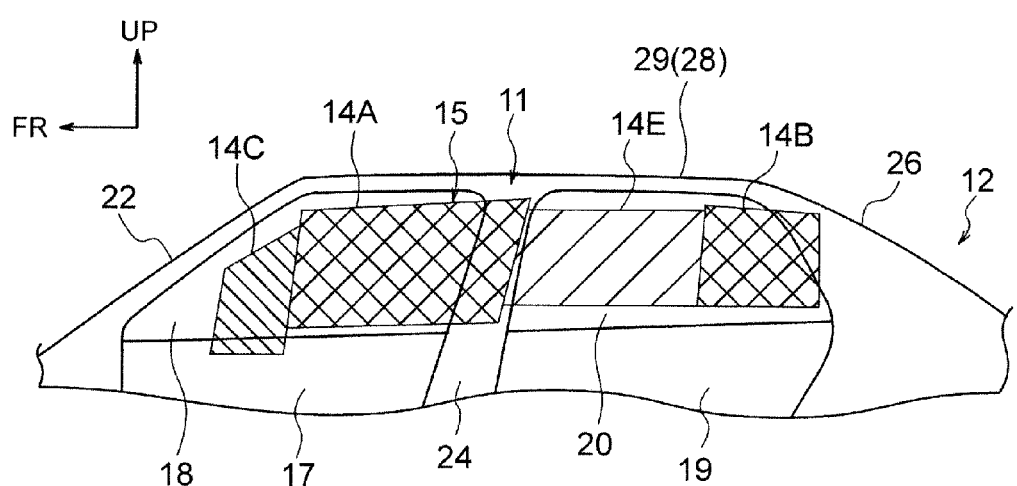
FIG. 2 is a side view corresponding to FIG. 1, illustrating a schematic configuration of a modified example of a vehicle curtain airbag device according to the first exemplary embodiment.

The curtain airbag 14 includes a front main chamber 14A and a rear main chamber 14B, for protecting a passenger in the front seat and a passenger in the rear seat from a side collision. The curtain airbag 14 further includes a front oblique collision chamber 14C and a rear oblique collision chamber 14D for protecting the front seat occupant and the rear seat occupant from an oblique collision. The curtain airbag 14 moreover includes a rollover chamber 14E (referred to below as the R/O chamber 14E) for protecting the rear seat occupant from a rollover. Note that configuration may be made in which the rear oblique collision chamber 14D is omitted, and the R/O chamber 14E is extended as far as the location where the rear oblique collision chamber 14D is formed, as in a curtain airbag 15 of a vehicle curtain airbag device 11 (a modified example) illustrated in FIG. 2. FIG. 2 is labelled using the same reference numerals as those of similar configurations in the vehicle curtain airbag device 10.

In the curtain airbag 14 of the present exemplary embodiment illustrated in FIG. 1, the internal pressure of each chamber rises in the sequence: front and rear main chambers 14A, 14B, front and rear oblique collision chambers 14C, 14D, R/O chamber 14E. In the curtain airbag 15 illustrated in FIG. 2, the internal pressure of each chamber rises in the sequence: front and rear main chambers 14A, 14B, front oblique collision chamber 14C, R/O chamber 14E. Namely, in the present exemplary embodiment, the internal pressure of each chamber rises in the sequence: (i) chambers responding to side collision, (ii) chambers responding to oblique collision, (iii) a chamber responding to rollover.

Figure 3A:
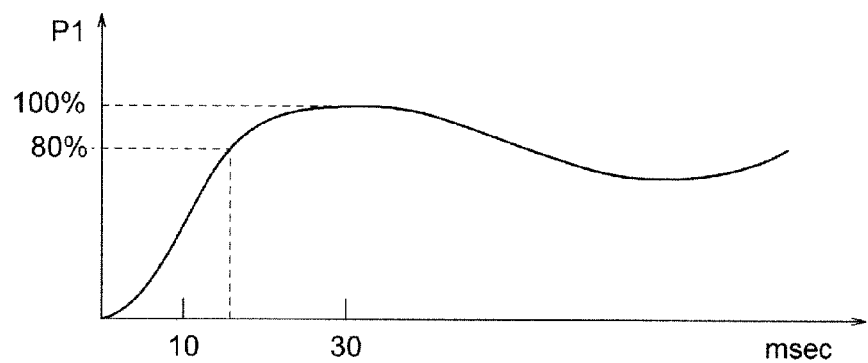
FIG. 3A is a line graph illustrating a relationship between time since actuation of an inflator and internal pressure of a main chamber.
Figure 3B:
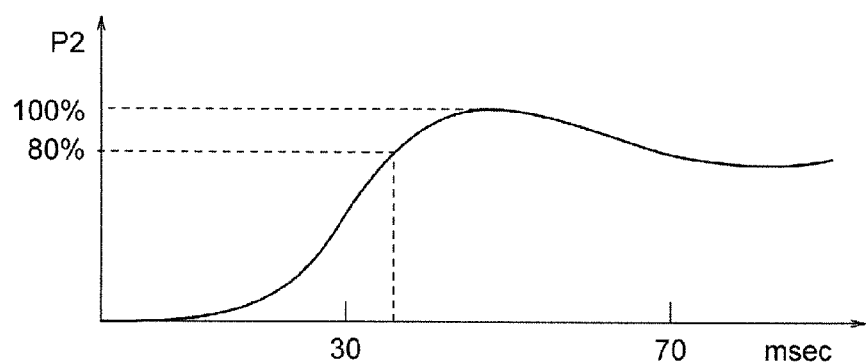
FIG. 3B is a line graph illustrating a relationship between time since actuation of an inflator and internal pressure of an oblique collision chamber.
Figure 3C:
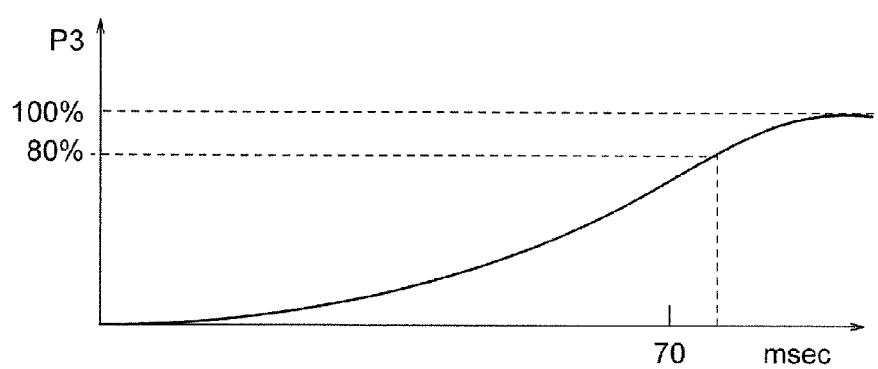
FIG. 3C is a line graph illustrating a relationship between time from actuation of an inflator and internal pressure of a rollover chamber.

Specifically, as illustrated in FIG. 3A, an internal pressure P1 of the chambers responding to side collision (front and rear main chambers 14A, 14B) reaches 80% of peak internal pressure between 10 msec and 30 msec after actuation of the inflator 16. Moreover, as illustrated in FIG. 3B, an internal pressure P2 of the chambers responding to oblique collision (front and rear oblique collision chambers 14C, 14D) reaches 80% of peak internal pressure between 30 msec and 70 msec after actuation of the inflator 16. As illustrated in FIG. 3C, an internal pressure P3 of the rollover-response chamber (R/O chamber 14E) reaches 80% of peak internal pressure at 70 msec after actuation of the inflator 16 or later. Explanation follows regarding specific configuration of the vehicle curtain airbag device 10, 11.

Overall Configuration of the Curtain Airbag Device

FIG. 4 is a side view illustrating an overall configuration of the vehicle curtain airbag device 10, as viewed from inside the vehicle cabin. FIG. 4 illustrates a state in which the curtain airbag 14 has inflated and deployed on receipt of gas supplied from the inflator 16. The curtain airbag 14 is ordinarily rolled up into an elongated shape (see FIG. 6) and housed together with the inflator 16 in a roof side section 28 provided at an upper end portion of the side section of the vehicle cabin. In this housed state, the elongated curtain airbag 14 extends from an A pillar (front pillar) 22 to the vicinity of a C pillar (rear pillar) 26 across the roof side section 28. The roof side section 28 includes a roof side rail 29, and a roof headlining, not illustrated in the drawings, and the curtain airbag 14 and the inflators 16 are housed between the roof side rail 29 and the roof headlining.

Each inflator 16 is a gas generation device for supplying gas into the curtain airbag 14, and employs, for example, a combustion method or cold gas method. A gas ejection section of the inflator 16 is in communication with the inside of the curtain airbag 14 through a connecting path 14G, described later. On actuation of the inflator 16, gas ejected from the gas ejection section is supplied into the curtain airbag 14.

The curtain airbags 14 and the inflators 16 described above are provided on both vehicle width direction sides of the car 12. Namely, the vehicle curtain airbag device 10 is provided with a pair of left and right curtain airbags 14 and a pair of left and right inflators 16. As illustrated in FIG. 4, the vehicle curtain airbag device 10 further includes an airbag ECU 38, electrically connected to a side collision sensor 32, a rollover sensor 34, and an oblique collision sensor 36, respectively.

The side collision sensor 32 is configured to predict or detect (the inevitability of) a side collision to the car 12, and output a side collision detection signal to the airbag ECU 38. The rollover sensor 34 is configured to predict or detect (the inevitability of) a rollover of the car 12, and output a rollover detection signal to the airbag ECU 38. The oblique collision sensor 36 is configured to predict or detect (the inevitability of) an oblique collision to the car 12, and output an oblique collision detection signal to the airbag ECU 38.

The airbag ECU 38 is electrically connected to the left and right inflators 16 respectively (only connection to one of the inflators 16 is illustrated in FIG. 1). The airbag ECU 38 is configured to actuate the inflator 16 on the side of a side collision or side of the oblique collision (the nearer side in either case) when input with a side collision detection signal or an oblique collision detection signal. Accordingly, in the event of a side collision or an oblique collision to the car 12, the curtain airbag 14 on the nearer side receives a gas supply, and inflates and deploys. The airbag ECU 38 is configured to actuate the inflators 16 on both sides in the vehicle width direction when input with a rollover detection signal. When input with a rollover detection signal following a side collision or an oblique collision, the airbag ECU 38 actuates the inflator 16 on the opposite side (far side) to the nearer side that has already been actuated.

Curtain Airbag Configuration

Explanation follows regarding specific configuration of the curtain airbag 14. Note that unless specifically indicated, explanation refers to the configuration (shape) of the curtain airbag 14 when in an inflated and deployed state.

The curtain airbag 14 is, for example, woven into an integral bag using a one piece woven method, shortened to OPW. In an OPW method, a seamless bag is formed by weaving two pieces of fabric on a Jacquard loom at the same time, with multiple ply weaving performed at necessary locations. The method for manufacturing the curtain airbag 14 is not limited to the above. For example, the curtain airbag 14 may be manufactured by stitching a bag shape from one or more base cloths, formed by cutting out nylon-based or polyester-based fabric.

As described above, the curtain airbag 14 includes the front and rear main chambers 14A, 14B, the front and rear oblique collision chambers 14C, 14D, and the RIO chamber 14E. The curtain airbag 14 further includes a gas supply path 14F placing the front main chamber 14A and the rear main chamber 14B in communication with each other, and the connecting path 14G connected to the inflator 16.

The main chamber 14A on the front side (referred to below as the front main chamber 14A) inflates and deploys to the side of a rear portion of the side window glass 18. A rear end portion of the front main chamber 14A is formed overlapping with the B pillar 24 as viewed from the side of the vehicle. The front main chamber 14A is set with a side collision head protection area that protects the head of the front seat occupant from a side collision.

The main chamber 14B on the rear side (referred to below as the rear main chamber 14B) inflates and deploys to the side of a rear portion of the side window glass 20. An upper portion side of a rear end portion of the rear main chamber 14B is formed overlapping with the C pillar 26 as viewed from the side of the vehicle. The rear main chamber 14B is set with a side collision head protection area that protects the head of the rear seat occupant from a side collision.

The gas supply path 14F extends in the front-rear direction of the curtain airbag 14 at a front-rear direction intermediate portion of an upper end portion of the curtain airbag 14, and places an upper portion of the front main chamber 14A and an upper portion of the rear main chamber 14B in communication with each other. The tube shaped connecting path 14G extends out from a front end side of the gas supply path 14F toward the upper and rear side. A leading end portion (rear end portion) of the connecting path 14G is connected to the gas ejection section of the inflator 16. The inflator 16 is disposed between the front main chamber 14A, this being a front section of the curtain airbag 14, and the rear main chamber 14B, this being a rear section of the curtain airbag 14, and is fixed to the roof side rail 29 through a bracket, not illustrated in the drawings.

The oblique collision chamber 14C on the front side (referred to below as the front oblique collision chamber 14C) inflates and deploys to the front of the front main chamber 14A, and configures a front end portion of the curtain airbag 14 that, from the front side of the front seat, protects the head of the front seat occupant from oblique collisions and rollovers. As viewed from the side of the vehicle, an upper portion side of a front end portion of the front oblique collision chamber 14C overlaps with the A pillar 22, and a lower end portion of the front oblique collision chamber 14C is formed projecting further to the lower side than the front main chamber 14A, so as to straddle above and below a door belt line BL of the front side door 17.

The front oblique collision chamber 14C is partially separated (partitioned) from the front main chamber 14A by a non-inflating portion (joint line portion) 42 extending in the up-down direction of the curtain airbag 14. An upper end portion of the non-inflating portion 42 is connected integrally to an upper portion 40A of an outer peripheral non-inflating portion (joint line portion) 40 set at an outer peripheral portion of the curtain airbag 14. A restricted flow path 52, serving as a first oblique collision supply opening at the front side, is provided at a lower end portion of the curtain airbag 14, between a lower end portion (ring shaped joint portion) 42A of the non-inflating portion 42 and a lower portion 40B of the outer peripheral non-inflating portion 40. A lower end portion of the front main chamber 14A and a lower end portion of the front oblique collision chamber 14C are placed in communication with each other through the restricted flow path 52. In FIG. 4, FIG. 5, and FIG. 7 to FIG. 9, the reference numeral 40B indicates the lower portion of the outer peripheral non-inflating portion 40, the reference numeral 40C indicates a front portion of the outer peripheral non-inflating portion 40, and the reference numeral 40D indicates a rear portion of the outer peripheral non-inflating portion 40. The upper portion 40A of the outer peripheral non-inflating portion 40 is separated at a rear end portion of the connecting path 14G, and the gas ejection section of the inflator 16 is connected at the separated portion.

The front oblique collision chamber 14C is provided so as to cover the test point furthest to the front side out of test points (impactor impact points or strike points) that are contacted by an impactor corresponding to the head of a front seat occupant in rollover testing (FMVSS 226 standard). Other test points relating to the front seat occupant in this rollover testing are covered by the front main chamber 14A.

The oblique collision chamber 14D on the rear side (referred to below as the rear oblique collision chamber 14D as required) inflates and deploys to the rear of the front main chamber 14A, and protects the head of the rear seat occupant at the front side of the rear seat from an oblique collision or a rollover. An upper side of a front end portion of the rear oblique collision chamber 14D is formed so as to overlap with the B pillar 24 as viewed from the side of the vehicle.

The rear oblique collision chamber 14D is positioned below a front portion of the gas supply path 14F, and is separated (partitioned) from the gas supply path 14F by a non-inflating portion (joint line portion) 44 extending in the front-rear direction of the curtain airbag 14. The rear oblique collision chamber 14D is also partially separated (partitioned) from the front main chamber 14A by a non-inflating portion (joint line portion) 46 extending from a front end portion of the non-inflating portion 44 toward a lower end side of the curtain airbag 14. A restricted flow path 54, serving as a second oblique collision supply opening at the rear side, is provided to a lower end portion of the curtain airbag 14 between the lower end portion (ring shaped joint portion) 46A of the non-inflating portion 46 and the lower portion 40B of the outer peripheral non-inflating portion 40. The lower end portion of the front main chamber 14A and a lower end portion of the rear oblique collision chamber 14D are placed in communication with each other through the restricted flow path 54.

The R/O chamber 14E inflates and deploys between the rear main chamber 14B and the rear oblique collision chamber 14D, and protects the head of the rear seat occupant at the front side of the rear seat from a rollover. The R/O chamber 14E is positioned below a rear portion of the gas supply path 14F, and is separated (partitioned) from the gas supply path 14F by the non-inflating portion 44 mentioned above. A non-inflating portion (joint line portion) 48 is integral to, and extends out from, a rear end portion of the non-inflating portion 44 toward the lower end side of the curtain airbag 14. A lower end portion of the non-inflating portion 48 is integrally connected to the lower portion 40B of the outer peripheral non-inflating portion 40. The R/O chamber 14E is separated (partitioned) from the rear main chamber 14B by the non-inflating portion 48.

A non-inflating portion (joint line portion) 50 is integral to, and extends out from a front-rear direction intermediate portion of the non-inflating portion 44 toward the lower end side of the curtain airbag 14, and the non-inflating portion 50 partially separates (partitions) the R/O chamber 14E from the rear oblique collision chamber 14D. A restricted flow path 56, serving as a rollover supply opening, is provided to a lower end portion of the curtain airbag 14 between a lower end portion (ring shaped joint portion) 50A of the non-inflating portion 50 and the lower portion 40B of the outer peripheral non-inflating portion 40. The lower end portion of the rear oblique collision chamber 14D and a lower end portion of the R/O chamber 14E are placed in communication with each other through the restricted flow path 56.

The R/O chamber 14E is provided so as to cover front-rear direction intermediate portion test points out of the test points (impactor impact points or strike points) contacted by an impactor corresponding to the head of a rear seat occupant in the rollover testing (FMVSS 226 standard) described above. In this rollover testing, test points at the front side and the rear side of the rear seat occupant are covered by the rear oblique collision chamber 14D and the rear main chamber 14B.

In the curtain airbag 14 configured as described above, the cross-sectional area of the restricted flow path 52, this being a gas supply opening to the front oblique collision chamber 14C, and the cross-sectional area of the restricted flow path 54, this being a gas supply opening to the rear oblique collision chamber 14D, are set to be substantially the same as each other. The cross-sectional area of the restricted flow path 56, this being a gas supply opening to the R/O chamber 14E, is set considerably smaller than the cross-sectional area of the restricted flow paths 52, 54. Specifically, the respective diameters d1, d2, d3 of the restricted flow paths 52, 54, 56 illustrated in FIG. 5 are set with the relationship $d1 \approx d2 >> d3$.

Figure 6:
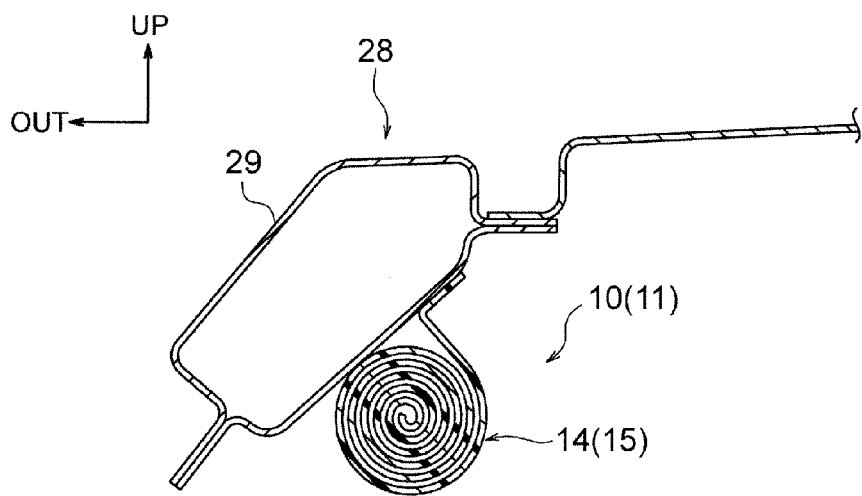
FIG. 6 is a vertical cross-section illustrating a housed state of the curtain airbag illustrated in FIG. 4, as viewed from the vehicle front side.

The upper portion 40A of the outer peripheral non-inflating portion 40, this being an upper edge of the curtain airbag 14, is provided with plural tabs, not illustrated in the drawings. The curtain airbag 14 is fixed to a vehicle body frame (the A pillar 22, the roof side rail 29, and the C pillar 26) by fixing implements such as clips, or nuts and bolts, which pass through the tabs. The front end portion of the curtain airbag 14 is supported by a lower portion of the A pillar 22 through a tension cloth 58. As illustrated in FIG. 6, the curtain airbag 14 is ordinarily rolled up from the lower end side to the upper end side and housed in the roof side section 28. The above is a specific configuration of the airbag device 10 explained in outline with reference to FIG. 1.

Figure 5:
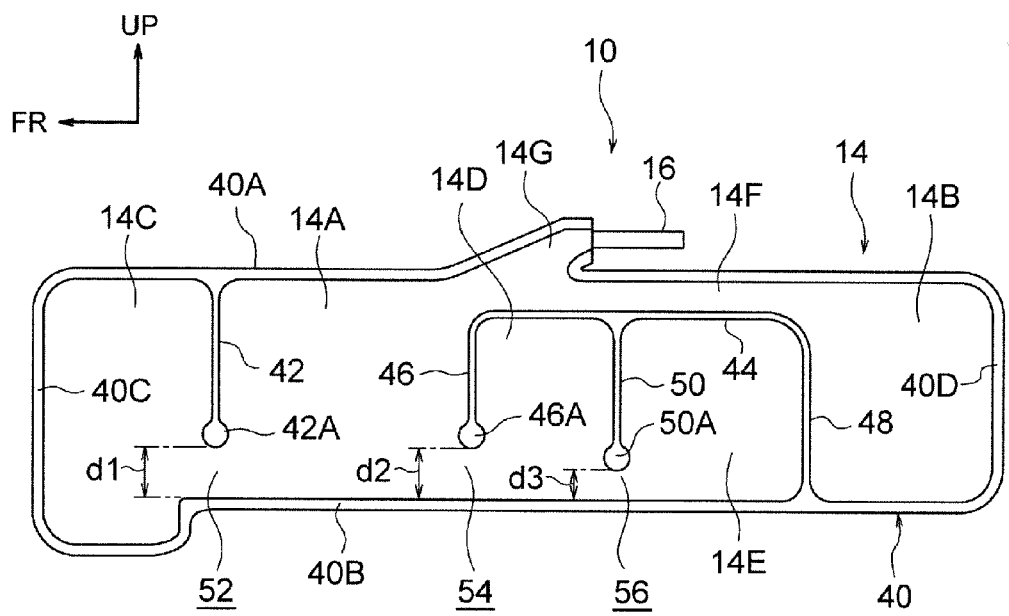
FIG. 5 is a side view illustrating a portion of the configuration illustrated in FIG. 4.
Figure 7:
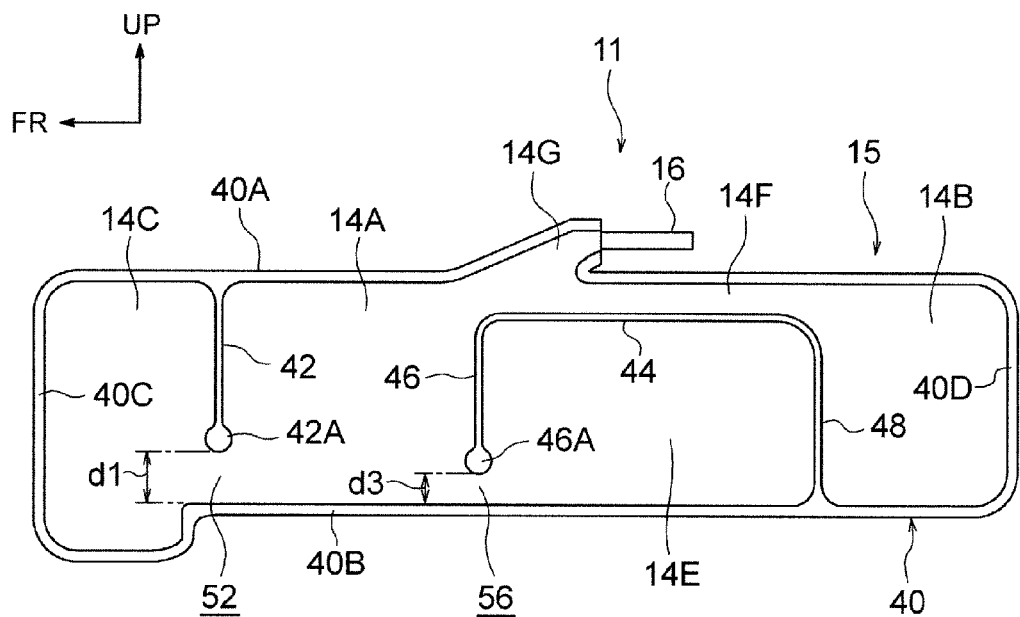
FIG. 7 is a side view corresponding to FIG. 5, illustrating configuration of relevant portions of the modified example illustrated in FIG. 2.

FIG. 7 is a side view corresponding to FIG. 5, illustrating a specific configuration of relevant portions of the vehicle curtain airbag device 11 (a modified example) explained in outline with reference to FIG. 2. In FIG. 7, configurations similar to those of the vehicle curtain airbag device 10 are allocated the same reference numerals. In the curtain airbag 15 of the vehicle curtain airbag device 11 illustrated in FIG. 7, the rear oblique collision chamber 14D, the non-inflating portion 50, and the restricted flow path 54 (rear oblique collision supply opening) of the curtain airbag 14 described above are omitted, and the R/O chamber 14E extends as far as the location where the rear oblique collision chamber 14D is formed. In the curtain airbag 15, the restricted flow path 56, serving as a rollover supply opening, is provided between the lower end portion of the non-inflating portion 46 and the lower portion 40B of the outer peripheral non-inflating portion 40. The lower end portion of the front main chamber 14A and a lower end portion of the R/O chamber 14E are placed in communication with each other through the restricted flow path 56. The curtain airbag 15 is similar to the curtain airbag 14 in other respects, and is normally housed in the roof side section 28 in a state rolled up from a lower end side to an upper end side (see FIG. 6).

Explanation follows regarding operation and advantageous effects of the first exemplary embodiment.

In the first exemplary embodiment, in the event of a side collision or an oblique collision to the car 12, the airbag ECU 38 is input with a side collision detection signal from the side collision sensor 32, or an oblique collision detection signal from the oblique collision sensor 36. The airbag ECU 38 accordingly actuates the inflator 16 on the nearer side.

Figure 8:
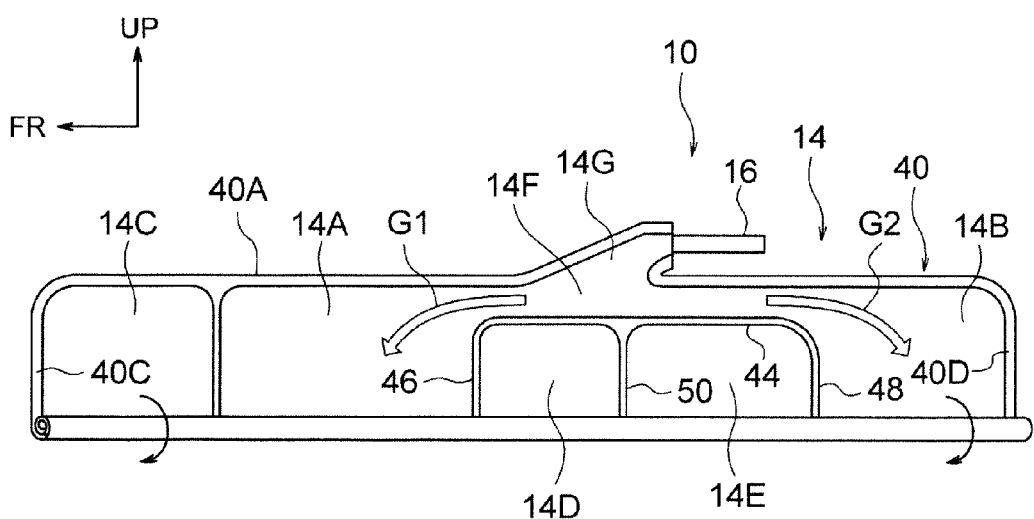
FIG. 8 is a side view illustrating a first state partway through inflation and deployment of the curtain airbag illustrated in FIG. 5.

On actuation of the inflator 16, gas ejected from the inflator 16 flows into the gas supply path 14F of the curtain airbag 14, and gas is supplied into the front and rear main chambers 14A, 14B through the gas supply path 14F (see arrows G1, G2 in FIG. 8). When the front and rear main chambers 14A, 14B begin to inflate and deploy, the curtain airbag 14 deploys toward the lower side as the curtain airbag 14 unrolls from the upper end side, as illustrated in FIG. 8.

Figure 9:
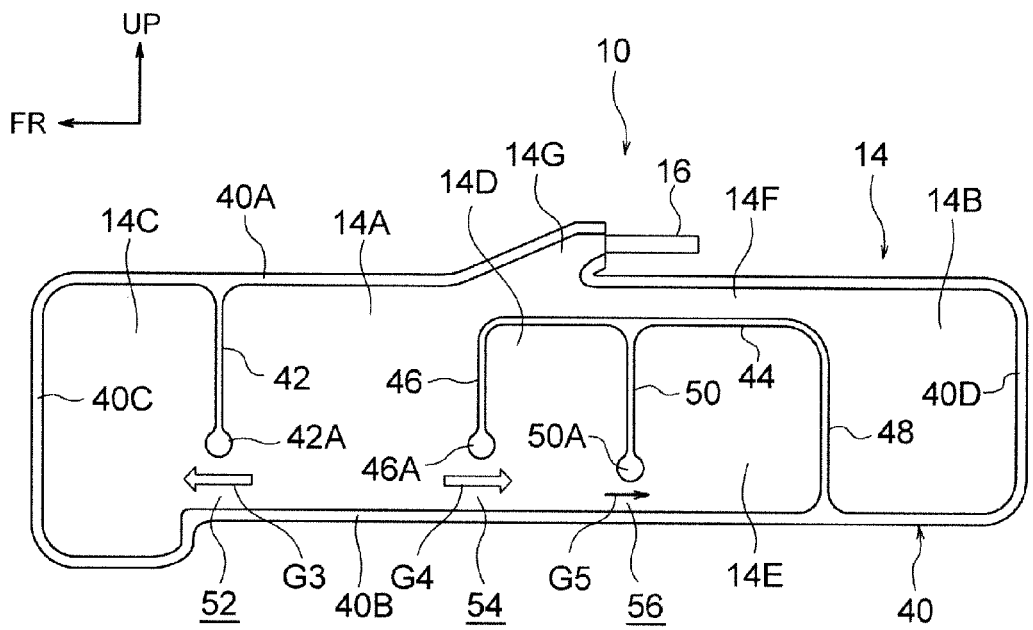
FIG. 9 is a side view illustrating a second state partway through inflation and deployment of the curtain airbag illustrated in FIG. 5.

Then, once the lower end side of the curtain airbag 14 has unrolled, a portion of the gas supplied to the front main chamber 14A is supplied to the front and rear oblique collision chambers 14C, 14D through the restricted flow paths 52, 54 provided at the lower end side of the curtain airbag 14 (see arrows G3, G4 in FIG. 9). The front and rear oblique collision chambers 14C, 14D accordingly inflate at a delayed timing to that of the front and rear main chambers 14A, 14B.

Moreover, a portion of the gas supplied to the rear oblique collision chamber 14D is supplied to the R/O chamber 14E through the restricted flow path 56 (see arrow G5 in FIG. 9). Since the cross-sectional area of the restricted flow path 56 is set smaller than the cross-sectional areas of the restricted flow paths 52, 54, the flow of gas into the R/O chamber 14E is restricted, and the R/O chamber 14E inflates at a delayed timing to that of the front and rear oblique collision chambers 14C, 14D.

In the present exemplary embodiment, the internal pressure of the respective chambers thereby rises in the sequence: (i) front and rear main chambers 14A, 14B, (ii) front and rear oblique collision chambers 14C, 14D, (iii) R/O chamber 14E. The internal pressure P1 of the front and rear main chambers 14A, 14B that respond to a side collision, the internal pressure P2 of the front and rear oblique collision chambers 14C, 14D that respond to an oblique collision, and the internal pressure P3 of the R/O chamber 14E that responds to a rollover can thereby be made to rise at the timings illustrated in FIG. 3A to FIG. 3C. A contribution is accordingly made to obtaining appropriate passenger protection performance in the respective collision modes of a side collision, an oblique collision, and a rollover.

Namely, since in a side collision, another vehicle collides with the side section of the vehicle body close to the front seat occupant and the rear seat occupant, early inflation and deployment of the front and rear main chambers 14A, 14B to swiftly protect the heads of the front seat occupant and the rear seat occupant is demanded. However, in an oblique collision, the other vehicle collides with a front section of the vehicle body at a distance from the front seat occupant and the rear seat occupant, and so the front seat occupant and the rear seat occupant move obliquely toward the front under inertia slightly after the time when the oblique collision takes place, since shock is absorbed by deformation of the vehicle front section. Accordingly, the front and rear oblique collision chambers 14C, 14D are required to inflate and deploy at a timing suited to this movement under inertia. Moreover, in a rollover, which can occur accompanying a side collision or an oblique collision, there is a risk of the front seat occupant and the rear seat occupant being ejected from the vehicle at a timing delayed from the occurrence of the side collision or the oblique collision. The R/O chamber 14E is accordingly required to inflate and deploy at a timing to suit this ejection from the vehicle. Hence, in the present exemplary embodiment, the internal pressure of each chamber rises in the sequence of: (i) front and rear main chambers 14A, 14B, (ii) front and rear oblique collision chambers 14C, 14D, (iii) R/O chamber 14E, thereby enabling the requirements for appropriate passenger protection performance for each of the above collision modes to be met.

Moreover, in the present exemplary embodiment, staggering the timings at which the internal pressure of the respective chambers rise as described above enables efficient utilization of the gas from the inflator 16, thereby avoiding the need to increase output of the inflator 16. As a result, since the curtain airbag 14 can be prevented from sustaining damage due to high pressure gas ejected from the inflator 16, there is no need for counter measures, such as manufacturing the curtain airbag 14 from tough base cloth, or adding reinforcement cloths, enabling an increase in manufacturing costs to be avoided.

In the present exemplary embodiment, gas from the inflator 16 is distributed (supplied) to the front and rear main chambers 14A, 14B through the gas supply path 14F, and an portion of the gas supplied to the front main chamber 14A is supplied to the front and rear oblique collision chambers 14C, 14D through the restricted flow paths 52, 54. Moreover, a portion of the gas supplied to the rear oblique collision chamber 14D is supplied to the R/O chamber 14E through the restricted flow path 56 that has a smaller cross-sectional area than the restricted flow paths 52, 54. This thereby enables the internal pressure of each of the chambers to be made to rise in the sequence: (i) the front and rear main chambers 14A, 14B, (ii) the front and rear oblique collision chambers 14C, 14D, (iii) the R/O chamber 14E, using a simple configuration.

In the present exemplary embodiment, a portion of the gas supplied to the front main chamber 14A is supplied to the front and rear oblique collision chambers 14C, 14D and the R/O chamber 14E through the restricted flow paths 52, 54, 56 provided at the lower end portion of the curtain airbag 14. Namely, the supply of gas to the front and rear oblique collision chambers 14C, 14D and the R/O chamber 14E can be prevented until the lower end side of the curtain airbag 14 has unrolled. This thereby enables the timings at which the internal pressures of the front and rear oblique collision chambers 14C, 14D and the R/O chamber 14E rise to be adjusted using a simple configuration.

Explanation with reference to the drawings regarding operation and advantageous effects of the vehicle curtain airbag device 11 illustrated in FIG. 7 is omitted; however the vehicle curtain airbag device 11 obtains the same basic operation and advantageous effects as the vehicle curtain airbag device 10 described above.

Namely, in the vehicle curtain airbag device 11, on actuation of the inflator 16, gas ejected from the inflator 16 flows into the gas supply path 14F of the curtain airbag 15, and the gas is supplied through the gas supply path 14F to the front and rear main chambers 14A, 14B. When the front and rear main chambers 14A, 14B begin to inflate and deploy, the curtain airbag 15 thereby deploys toward the lower side as the curtain airbag 15 unrolls from the upper end side. Once the lower end side of the curtain airbag 14 has unrolled, a portion of the gas supplied to the front main chamber 14A is supplied to the front oblique collision chamber 14C through the restricted flow path 52 provided at the lower end side of the curtain airbag 15, and supplied to the R/O chamber 14E through the restricted flow path 56 with a smaller cross-sectional area than the restricted flow path 52.

The internal pressure of the respective chambers accordingly rises in the sequence: (i) front and rear main chambers 14A, 14B, (ii) front oblique collision chamber 14C, (iii) R/O chamber 14E, thereby contributing to obtaining appropriate passenger protection performance for each collision mode of a side collision, an oblique collision, and a rollover. Moreover, staggering the timing at which the internal pressure of each chamber rises enables efficient utilization of the gas from the inflator 16, thus avoiding the need to increase output of the inflator 16.

Next, explanation follows regarding other exemplary embodiments of the present disclosure. Configurations and operation that are basically the same as in the first exemplary embodiment are allocated the same reference numerals as in the first exemplary embodiment, and explanation thereof is omitted.

Second Exemplary Embodiment

Figure 10:
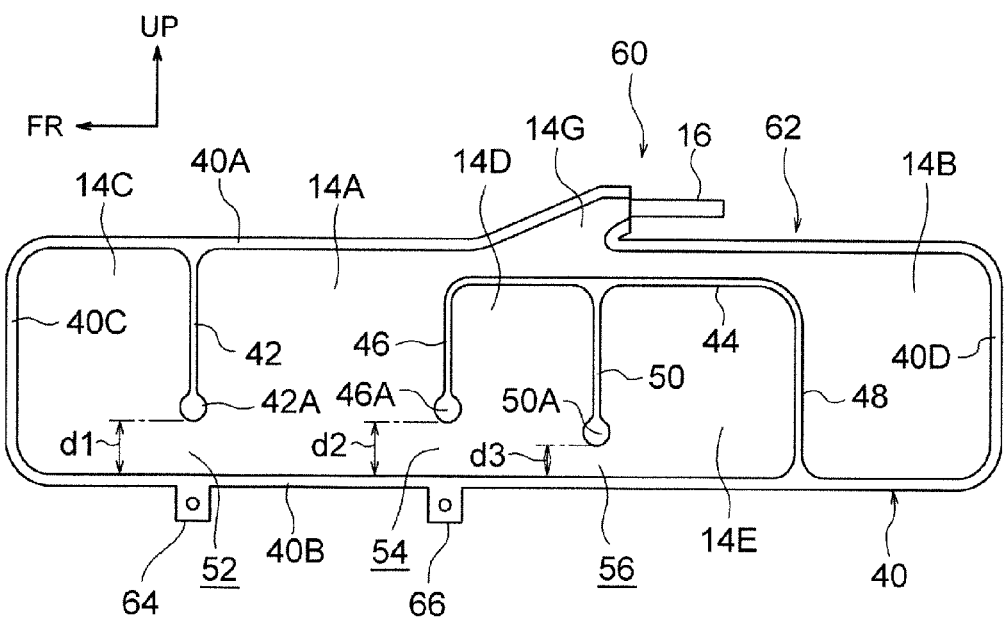
FIG. 10 is a side view corresponding to FIG. 5, illustrating configuration of relevant portions of a vehicle curtain airbag device according to a second exemplary embodiment of the present disclosure.

FIG. 10 is a side view corresponding to FIG. 5 and illustrating configuration of relevant portions of a vehicle curtain airbag device 60 according to a second exemplary embodiment of the present disclosure. In the vehicle curtain airbag device 60, the configuration of a curtain airbag 62 differs from that of the curtain airbag 14 of the first exemplary embodiment. The curtain airbag 62 has basically the same configuration as the curtain airbag 14 of the first exemplary embodiment; however the lower end portion of the front oblique collision chamber 14C does not project out further to the lower side than the lower end portion of the front main chamber 14A. Moreover, in the curtain airbag 62, a pair of front and rear tabs 64, 66 extend out toward the lower side from the lower portion 40B of the outer peripheral non-inflating portion 40. The tabs 64, 66 are positioned below the non-inflating portions 42, 46.

Figure 11:
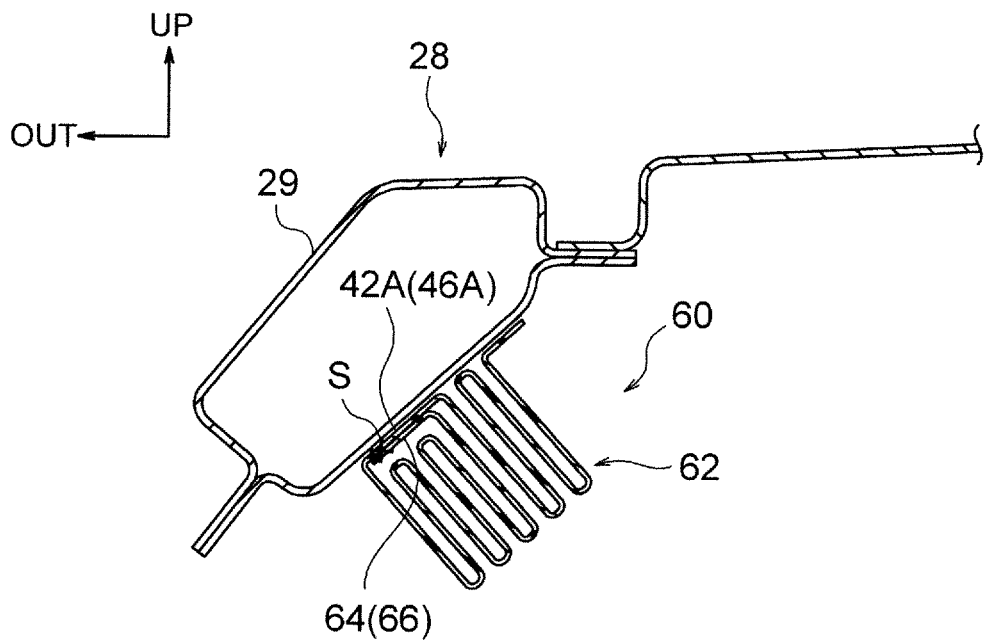
FIG. 11 is a vertical cross-section illustrating a housed state of the curtain airbag illustrated in FIG. 10, as viewed from the vehicle front side.

During manufacture of the curtain airbag 62, the lower end side of the curtain airbag 14 is pleat folded (see FIG. 11), and the tabs 64, 66 are overlaid with the lower end portions 42A, 46A of the non-inflating portions 42, 46 and stitched together at a tear seam (see the stitched portion S in FIG. 11). Namely, the lower end side of the curtain airbag 62 are stitched with a tear seam at the side of the front main chamber 14A (at the locations formed with the restricted flow paths 52, 54 in this example). Then, as illustrated in FIG. 11, the curtain airbag 62 is further pleat folded toward the upper end side, and housed in the roof side section 28. Other than the above, configuration is similar to that of the first exemplary embodiment.

In the vehicle curtain airbag device 60, gas from the inflator 16 is supplied to the front and rear main chambers 14A, 14B through the gas supply path 14F provided at the upper end side of the curtain airbag 14. Accordingly, when the front and rear main chambers 14A, 14B begin to inflate and deploy, the curtain airbag 62 deploys toward the lower side while unfolding from the folded state from the upper end side. The folded state unfolds at the lower end side of the curtain airbag 62 when the tear seam stitched at the side of the front main chamber 14A at the lower end side of the curtain airbag 62 splits under inflation pressure of the front main chamber 14A. A portion of the gas supplied to the front main chamber 14A is thereby supplied to the front and rear oblique collision chambers 14C, 14D through the restricted flow paths 52, 54 provided at the lower end side of the curtain airbag 62. Moreover, a portion of the gas supplied to the rear oblique collision chamber 14D is supplied to the R/O chamber 14E through the restricted flow path 56.

Due to the above, in the present exemplary embodiment, the internal pressure of each chamber rises in the sequence: (i) front and rear main chambers 14A, 14B, (ii) front and rear oblique collision chambers 14C, 14D, (iii) R/O chamber 14E. This thereby enables basically the same operation and advantageous effects to be obtained as in the first exemplary embodiment. Moreover, the supply of gas to the front and rear oblique collision chambers 14C, 14D and the R/O chamber 14E can be prevented until the tear seam splits and the rolled up state of the lower end side of the curtain airbag 62 unrolls. This thereby enables the timing at which the internal pressures of the oblique collision chambers 14C, 14D and the R/O chamber 14E rise to be adjusted using a simple configuration.

Supplementary Explanation of the Exemplary Embodiments

In the first exemplary embodiment, configuration is made in which the curtain airbag 14 is rolled up from the lower end side to the upper end side; however the present disclosure is not limited thereto. For example, the lower end side of the curtain airbag 14 may be rolled up while the upper end side of the curtain airbag 14 is pleat folded.

In the second exemplary embodiment, configuration is made in which the curtain airbag 62 is pleat folded from the lower end side to the upper end side; however the present disclosure is not limited thereto. The curtain airbag 62 may be folded from the lower end side to the upper end side using a folding method other than pleat folding.

Various other modifications to the present disclosure may be implemented within a range not departing from the spirit of the present disclosure. It goes without saying that the scope of rights encompassed by the present disclosure is not limited by the respective exemplary embodiments described above.

What is claimed is:

1. A vehicle curtain airbag device comprising:
   a curtain airbag, including:
      a front main chamber and a rear main chamber that protect a front seat occupant and a rear seat occupant from a side collision;
      a front oblique collision chamber that is disposed at a vehicle front side of the front main chamber, and that protects the front seat occupant from an oblique collision;
      a rollover chamber that is disposed between the front main chamber and the rear main chamber, and that protects the rear seat occupant from a rollover;
      a gas supply path that supplies gas from an inflator to the front main chamber and the rear main chamber;
      a front oblique collision supply opening that supplies gas to the front oblique collision chamber via the front main chamber; and
      a rollover supply opening that supplies gas to the rollover chamber via the front main chamber,
   wherein the front oblique collision supply opening and the rollover supply opening are configured to have a lower portion of an outer peripheral non-inflating portion of the curtain airbag as lower ends thereof, after inflation and deployment of the front main chamber, the rear main chamber, the front oblique collision chamber and the rollover chamber, and
   wherein the curtain airbag is configured such that, during inflation and deployment of the front main chamber, the rear main chamber, the front oblique collision chamber, and the rollover chamber on receipt of gas supplied from an inflator, an internal pressure of each chamber rises in the following sequence: (i) the front main chamber and the rear main chamber, then (ii) the front oblique collision chamber, and then (iii) the rollover chamber.

2. The vehicle curtain airbag device of claim 1, wherein:
   the curtain airbag further includes a rear oblique collision chamber that is disposed between the front main chamber and the rollover chamber, and that protects the rear seat occupant from an oblique collision, and a rear oblique collision supply opening that supplies gas to the rear oblique collision chamber via the front main chamber;
   the rear oblique collision supply opening is configured to have the lower portion of the outer peripheral non-inflating portion of the curtain airbag as a lower end thereof, after inflation and deployment of the front main chamber, the rear main chamber, the front oblique collision chamber and the rollover chamber, and the curtain airbag is configured such that, during inflation and deployment of the front main chamber, the rear main chamber, the front oblique collision chamber, the rear oblique collision chamber, and the rollover chamber on receipt of gas supplied from the inflator, an internal pressure of each chamber rises in the following sequence: (i) the front main chamber and the rear main chamber, then (ii) the front oblique collision chamber and the rear oblique collision chamber, and then (iii) the rollover chamber.

3. The vehicle curtain airbag device of claim 2, wherein the rollover supply opening is set with a smaller cross-sectional area than the front oblique collision supply opening and the rear oblique collision supply opening.

4. The vehicle curtain airbag device of claim 3, wherein:
the gas supply path is disposed at an upper end side of the curtain airbag;
the front oblique collision supply opening, the rear oblique collision supply opening, and the rollover supply opening are disposed at a lower end side of the curtain airbag; and
the curtain airbag is housed in an upper end side of a side section of a vehicle cabin, in a state rolled up from the lower end side to the upper end side of the curtain airbag.

5. The vehicle curtain airbag device of claim 3, wherein:
the gas supply path is disposed at an upper end side of the curtain airbag; and
the curtain airbag is housed in an upper end side of a side section of a vehicle cabin, in a state in which a lower end side of the curtain airbag is folded up and the lower end side is stitched with a tear seam at a side of the front main chamber, and further folded up toward the upper end side of the curtain airbag.

6. The vehicle curtain airbag device of claim 5, wherein:
the lower end side of the curtain airbag unfolds from a folded state when the tear seam splits due to inflation pressure of the gas supplied from the inflator the front main chamber.

7. The vehicle curtain airbag device of claim 1, wherein the rollover supply opening is set with a smaller cross-sectional area than the front oblique collision supply opening.

8. The vehicle curtain airbag device of claim 7, wherein:
the gas supply path is disposed at an upper end side of the curtain airbag;
the front oblique collision supply opening and the rollover supply opening are disposed at a lower end side of the curtain airbag; and
the curtain airbag is housed in an upper end side of a side section of a vehicle cabin, in a state rolled up from the lower end side to the upper end side of the curtain airbag.

9. The vehicle curtain airbag device of claim 7, wherein:
the gas supply path is disposed at an upper end side of the curtain airbag; and
the curtain airbag is housed in an upper end side of a side section of a vehicle cabin, in a state in which a lower end side of the curtain airbag is folded up and the lower end side is stitched with a tear seam at a side of the front main chamber, and further folded up toward the upper end side of the curtain airbag.

10. The vehicle curtain airbag device of claim 9, wherein:
the lower end side of the curtain airbag unfolds from a folded state when the tear seam splits due to inflation pressure of the gas supplied from the inflator the front main chamber.

11. A vehicle curtain airbag device comprising:
a curtain airbag, including:
a front main chamber and a rear main chamber that protect a front seat occupant and a rear seat occupant from a side collision;
a front oblique collision chamber that is disposed at a vehicle front side of the front main chamber, and that protects the front seat occupant from an oblique collision;
a rollover chamber that is disposed between the front main chamber and the rear main chamber, and that protects the rear seat occupant from a rollover;
a rear oblique collision chamber that is disposed between the front main chamber and the rollover chamber, and that protects the rear seat occupant from an oblique collision; and
a gas supply path that supplies gas from an inflator to the front main chamber and the rear main chamber;
a front oblique collision supply opening that supplies gas to the front oblique collision chamber via the front main chamber;
a rear oblique collision supply opening that supplies gas to the rear oblique collision chamber via the front main chamber; and
a rollover supply opening that supplies gas to the rollover chamber via the rear oblique collision chamber, and that is set with a smaller cross-sectional area than the front oblique collision supply opening and the rear oblique collision supply opening,
wherein the curtain airbag is configured such that, during inflation and deployment of the front main chamber, the rear main chamber, the front oblique collision chamber, the rear oblique collision chamber, and the rollover chamber on receipt of gas supplied from the inflator, an internal pressure of each chamber rises in the following sequence: (i) the front main chamber and the rear main chamber, then (ii) the front oblique collision chamber and the rear oblique collision chamber, and then (iii) the rollover chamber.

12. The vehicle curtain airbag device of claim 11, wherein:
the gas supply path is disposed at an upper end side of the curtain airbag;
the front oblique collision supply opening, the rear oblique collision supply opening, and the rollover supply opening are disposed at a lower end side of the curtain airbag; and
the curtain airbag is housed in an upper end side of a side section of a vehicle cabin, in a state rolled up from the lower end side to the upper end side of the curtain airbag.

13. The vehicle curtain airbag device of claim 11, wherein:
the gas supply path is disposed at an upper end side of the curtain airbag; and
the curtain airbag is housed in an upper end side of a side section of a vehicle cabin, in a state in which a lower end side of the curtain airbag is folded up and the lower end side is stitched with a tear seam at a side of the front main chamber, and further folded up toward the upper end side of the curtain airbag.

14. The vehicle curtain airbag device of claim 13, wherein:
    the lower end side of the curtain airbag unfolds from a folded state when the tear seam splits due to inflation pressure of the gas supplied from the inflator the front main chamber.

\* \* \* \* \*

UNITED STATES PATENT AND TRADEMARK OFFICE
CERTIFICATE OF CORRECTION

PATENT NO. : 9,744,935 B2  
APPLICATION NO. : 14/745906  
DATED : August 29, 2017  
INVENTOR(S) : Mitsuyoshi Ohno and Osamu Fukawatase Page 1 of 1

It is certified that error appears in the above-identified patent and that said Letters Patent is hereby corrected as shown below:

On the Title Page

Item (72), Inventor city, delete "Moyoshi" and insert --Miyoshi--, therefor.

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*